Figure 1:
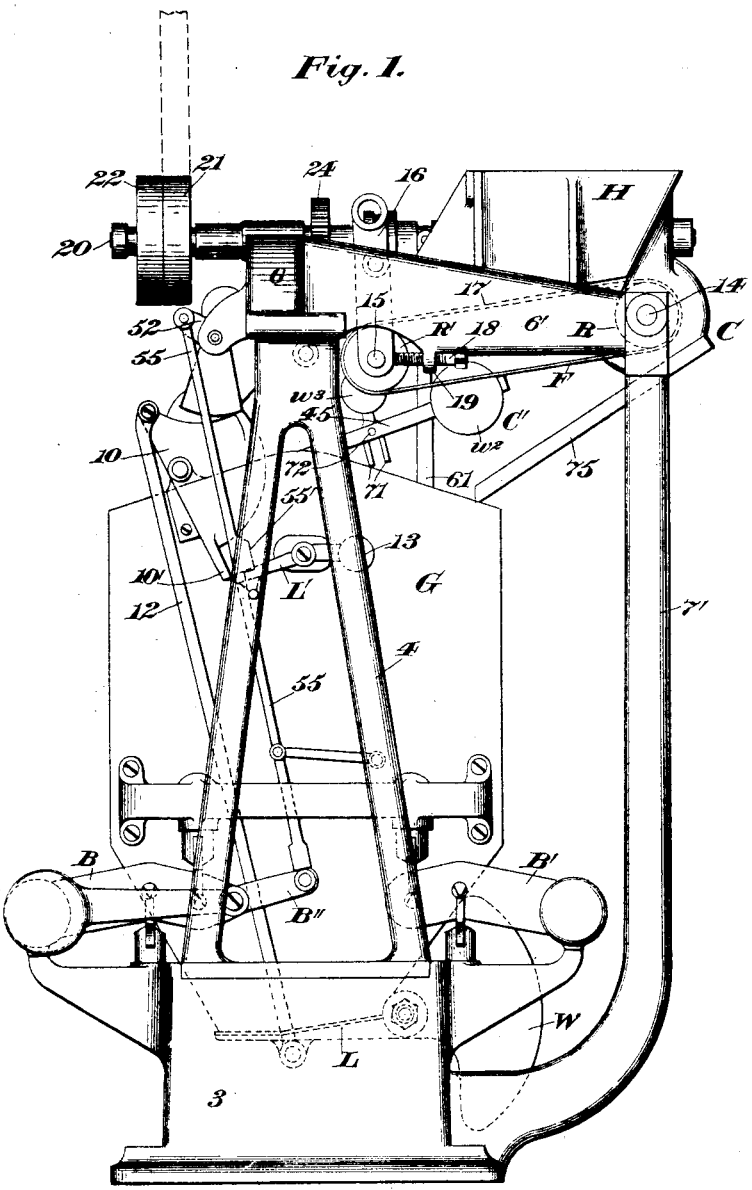

No. 607,483. Patented July 19, 1898.
J. CHRISTIANSEN.
AUTOMATIC WEIGHING MACHINE.
(Application filed Nov. 4, 1897.)

(No Model.) 4 Sheets—Sheet 1.

Witnesses
Chas. F. Schmelz
Fred. J. Dole.

Inventor
John Christiansen,
By his Attorney
F. H. Richards.

No. 607,483. Patented July 19, 1898.
J. CHRISTIANSEN.
AUTOMATIC WEIGHING MACHINE.
(Application filed Nov. 4, 1897.)
(No Model.) 4 Sheets—Sheet 2.

Witnesses
Chas. F. Schmelz
Fred. J. Dole.

Inventor:
John Christiansen,
By his Attorney
F. H. Richards.

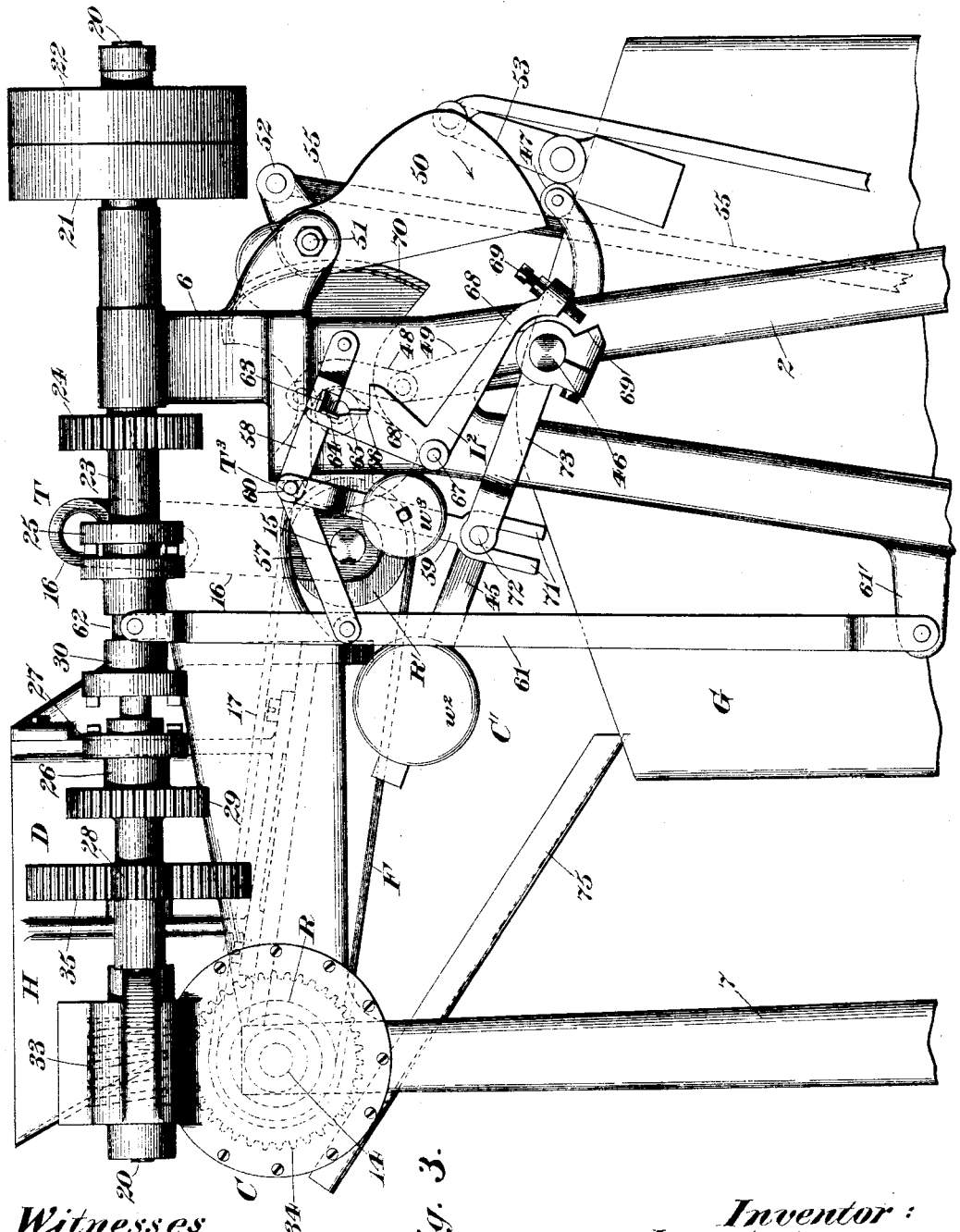

No. 607,483. Patented July 19, 1898.
J. CHRISTIANSEN.
AUTOMATIC WEIGHING MACHINE.
(Application filed Nov. 4, 1897.)
(No Model.) 4 Sheets—Sheet 4.
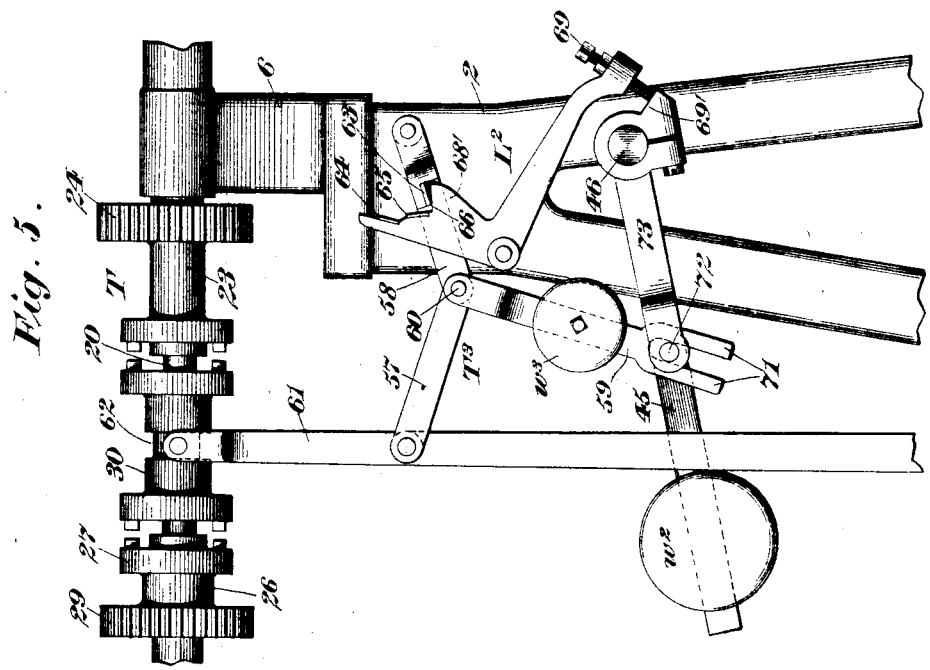
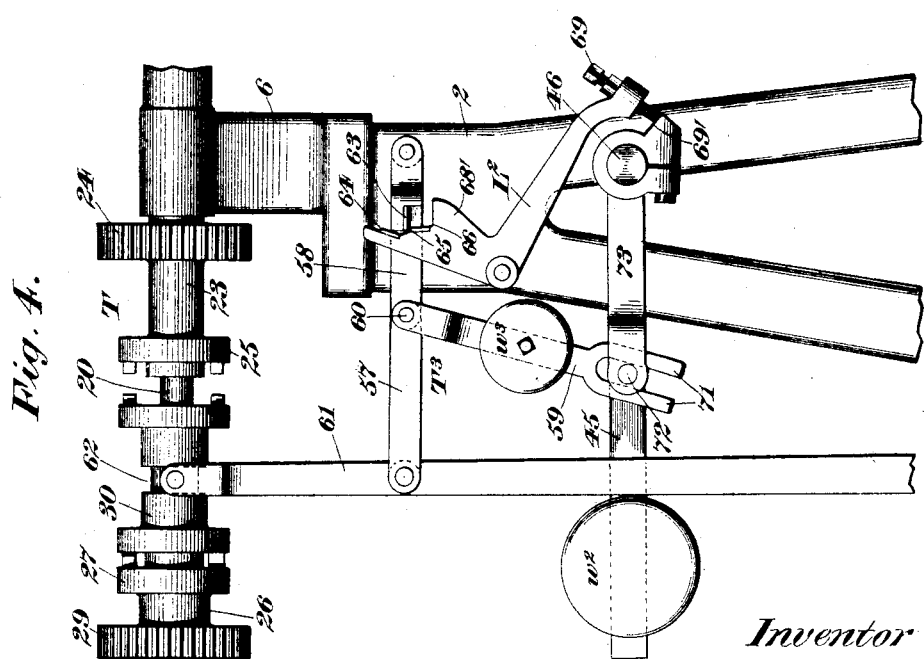
Witnesses
Chas. F. Schmelz
Fred. J. Dole.
Inventor
John Christiansen,
By his Attorney
F. H. Richards.

UNITED STATES PATENT OFFICE.

JOHN CHRISTIANSEN, OF HARTFORD, CONNECTICUT, ASSIGNOR TO THE PRATT & WHITNEY COMPANY, OF SAME PLACE.

AUTOMATIC WEIGHING-MACHINE.

SPECIFICATION forming part of Letters Patent No. 607,483, dated July 19, 1898.

Application filed November 4, 1897. Serial No. 657,351. (No model.)

*To all whom it may concern:*

Be it known that I, JOHN CHRISTIANSEN, a citizen of the United States, residing at Hartford, in the county of Hartford and State of Connecticut, have invented certain new and useful Improvements in Automatic Weighing-Machines, of which the following is a specification.

This invention relates to an automatic weighing-machine of that class embodying a variable-speed feeder and feeder-actuating means constructed and organized for imparting different velocities to and for stopping the feeder at different predetermined points in the operation of the weighing-mechanism and to thereby regulate the volume of the stream supplied to the load-receiver, a machine of this character being described in Letters Patent of the United States No. 572,088, granted to Francis H. Richards November 24, 1896, to which reference may be had.

One of the objects of my present invention is to provide, in connection with the feeder of an automatic weighing-machine, an improved feeder-actuating mechanism controlled by the weighing mechanism for varying the speed of the feeder, and consequently the volume of material supplied thereto, in proportion to the requirements, as indicated by the position of the weighing mechanism relatively to a truly-poised position and for stopping the operation of the feeder concurrently with the arrival of the weighing mechanism at its truly-poised position.

A further object of the invention is to provide, in connection with a power-driven feeder of a weighing-machine, improved actuating mechanism therefor, including a constantly-driven power-shaft embodying two power-transmitting gears of different sizes loosely mounted thereon, a clutch device splined to said shaft and operable for coupling one or the other power-transmitting gear to said shaft, according to the position of the weighing mechanism, a counter-shaft in geared connection with the feeder and with the power-transmitting gears of the power-shaft, a clutch-actuator in connection with the clutch and embodying a toggle, and means controlled by the weighing mechanism for shifting the toggle to throw the clutch device into engagement with one or the other of the power-transmitting gears to increase or decrease the velocity of the feeder or to a neutral position between said gears to stop the feeder, according to the position of the weighing mechanism.

Figure 2:
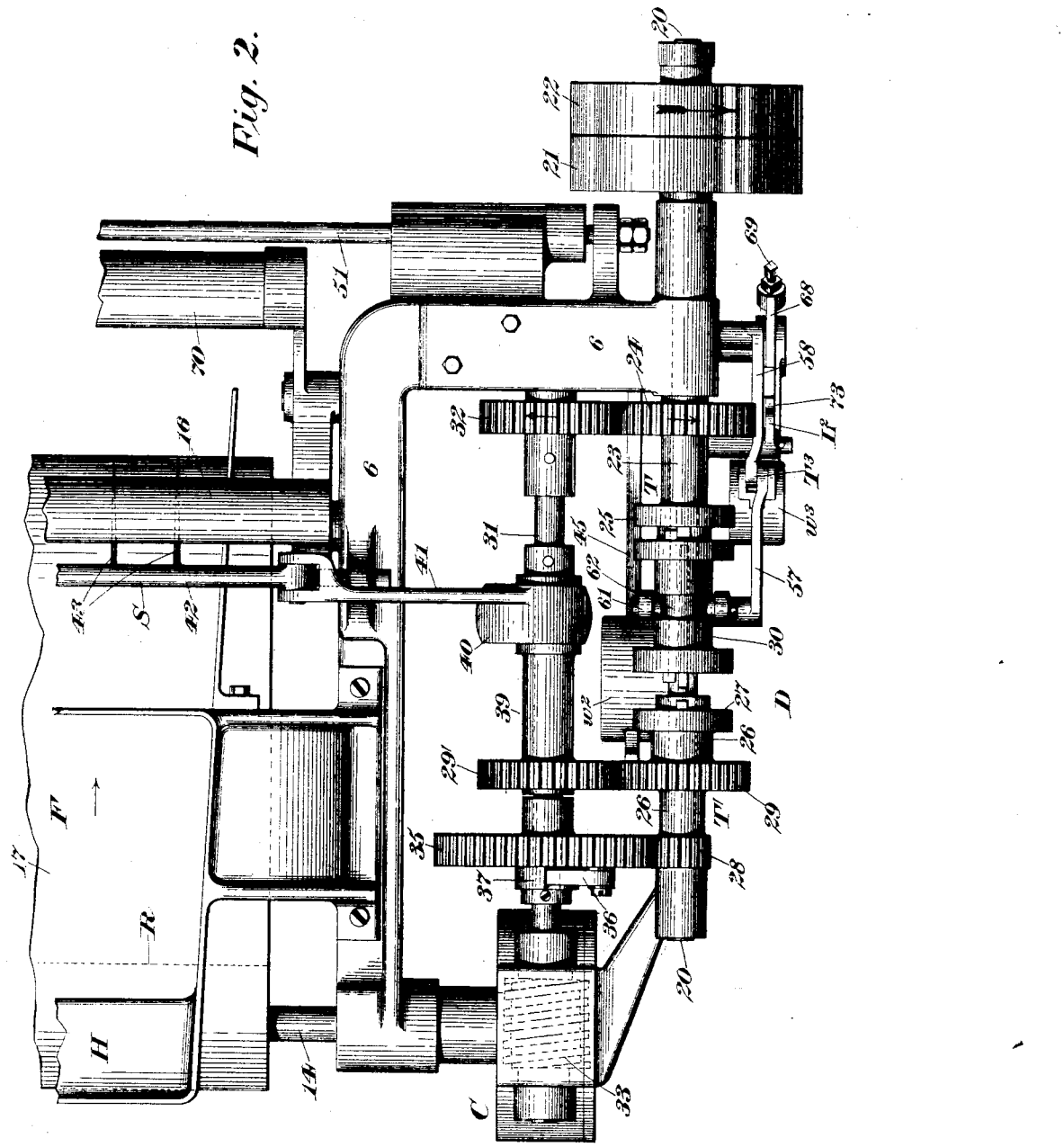

In the drawings accompanying and forming part of this specification, Figure 1 is a side elevation of a weighing-machine embodying my present improvements. Fig. 2 is a plan view of a portion of the weighing-machine on a relatively large scale as compared with Fig. 1, parts being broken away, said figure showing the parts of the feeder-actuating mechanism in the positions they occupy when the feeder is driven at its maximum velocity. Fig. 3 is a side elevation of the upper portion of the machine and shows the feeder actuating and controlling instrumentalities in the positions thereof illustrated in Fig. 2. Fig. 4 is a side elevation similar to Fig. 3 of a portion of the upper part of the weighing-machine, showing the shiftable clutch member of the power-shaft in engagement with the clutch member of the low-speed power-transmitter and the clutch-actuating instrumentalities in the positions they occupy when said shiftable clutch member is in this position; and Fig. 5 is a side elevation similar to Fig. 4, showing the shiftable clutch member in a neutral position between the high and low speed power-transmitter and the clutch-actuating instrumentalities in the position they occupy when the shiftable clutch member is in this neutral position.

Similar characters designate like parts in all the figures of the drawings.

For convenience my present improvements are shown embodied in a weighing-machine which, in so far as the weighing mechanism is concerned, is of substantially the same general construction, organization, and operation as the machine described in Letters Patent of the United States No. 548,840, granted to Francis H. Richards October 29, 1895, to which reference may be had.

The framework for supporting the operative parts of the weighing mechanism may be of any suitable character and will consist of two side frames 2 and 4, of usual construction, mounted upon a chambered supporting-base 3, into which the successive loads are discharged, and two rearwardly-extended brackets or top frames 6 and 6', supported at their inner ends upon the side frames 2 and 4 and at their rear outer ends upon uprights 7 and 7', supported on the base 3 of the machine.

The beam mechanism herein illustrated comprises oppositely-disposed scale-beams B and B', respectively, mounted upon the chambered supporting-base 3 and embodying suitable means for supporting the bucket or load-receiver, which latter is designated in a general way by G. The bucket is shown supported on the beams in substantially the same manner as the bucket in Patent No. 548,840, referred to.

The closer for the load-receiver is designated in a general way by L and is shown of substantially the same construction as the closer illustrated in Patent No. 548,840, referred to, and consists of a flat plate pivotally supported on the load-receiver at the lower end thereof and at one side the longitudinal axis of said receiver and having a counterweight W for exerting a closing stress upon said closer to return the same to its normal closed position after the load is discharged and the load-receiver has returned to its normal elevated load-receiving position.

As a means for sustaining the closer L against accidental opening movement a rocker 10 is shown pivotally supported on the bucket G near the upper rearward side thereof, which rocker constitutes one member of a closer-sustaining toggle. The other member of said toggle is shown as a sustaining-rod 12, which is pivotally connected at its upper end to the rocker and at its lower end to the closer L (see Fig. 1) in such a manner that when the closer is in its normal or shut position the two pivots of said rod or toggle member will be substantially in alinement with and the upper one of said pivots will be above the rocker-pivot, so that the rocker, and hence the connected closer, may be held against movement by a latch or like device, hereinafter described, with a minimum pressure thereon, as practically the entire weight of the bucket contents will be supported from the rocker-pivot.

For holding the rocker 10 against oscillatory movement when the closer is in its closed position a latch L' is herein shown pivotally supported upon the bucket G and provided with a detent for engaging a coöperating detent on one end of an arm 10' on the rocker 10 and the closer-latch L' is held normally in engagement with the rocker by means of a counterweight 13.

For releasing the closer it will be apparent that the latch L' will be depressed, thus disengaging the same from the rocker-arm 10', which will leave the closer free to be forced open by the weight of the bucket contents, thereby effecting the discharge of the bucket-load.

The means for supplying material to the load-receiver G comprises, in the preferred form illustrated most clearly in Figs. 1 to 3, inclusive, a supply hopper or chute H, supported between the brackets or top frames 6 and 6' and having its discharge-opening located at one side of and above the load-receiver, an endless feeder F, supported below the discharge-opening of the supply-hopper upon suitable rolls R and R', one of which rolls, as R, is fixed to a shaft 14, journaled in suitable bearings on the top frames at a point below and slightly in the rear of the rear wall of the supply-hopper, and the other of which, as R', is loosely mounted on a shaft 15, mounted in an oscillatory hanger 16, pivotally supported intermediate its ends on the top frames 6 and 6' for movement toward and away from the roll R, said roll R' being located above the receiving-opening of the load-receiver and with its axis somewhat below an imaginary horizontal line drawn through the axis of the roll R. The feeder F, which may consist of an endless belt or apron, of canvas, leather, or other suitable material, has its upper run 17 inclined downwardly from the rear toward the forward end thereof.

As a convenient means for adjusting the roll R' with relation to the roll R for the purpose of compensating for the elongation of and for taking up the slack in the feed-belt I have provided an adjusting device which in the form thereof shown most clearly in Fig. 1 of the drawings consists of a set-screw 18, extended through a flange 19 on the top frame and bearing at its inner end against the lower end of the oscillatory or shiftable roll-supporting hanger 16.

The supply-hopper and feeder, it will be obvious, may be of any suitable general construction and organization, and the construction and organization thereof illustrated in the accompanying drawings may be variably modified without departure from this invention.

In weighing-machines of the present character employing an endless power-driven feeder it is important that the movements or velocity of the feeder be so governed that the feeder will have all the essential characteristics and functions of a stream-controlling valve such as described in Patent No. 548,840, hereinbefore referred to—that is to say, a feed mechanism should be provided for actuating the feeder in such manner that the feeder will have a maximum velocity for supplying a stream of large volume when the load-receiver is in its extreme elevated position and shall have a decreased velocity for supplying a relatively small or drip stream to the load-receiver as said receiver approaches its poising position, and whereby also said feeder may be quickly stopped on the arrival of the load-receiver substantially at its true poised position to thereby discontinue the supply to the load-receiver.

As a simple and convenient means for actuating the feeder I have provided in operative connection with said feeder differential feeder-driving mechanism (designated in a general way by D) embodying a high and low speed power-transmitter and means operative at predetermined points in the movements of the weighing mechanism for rendering one or the other of said power-transmitters effective for actuating the feeder, whereby the feeder will be operative for supplying a stream of large volume to the load-receiver when said receiver is in its elevated position and will be operative for supplying a relatively small drip stream to the load-receiver as said receiver approaches its poised position.

The feeder-actuating mechanism, in the preferred form thereof shown most clearly in Figs. 2 and 3 of the drawings, comprises a power-shaft 20, journaled in suitable bearings on one of the top frames and having fast and loose pulleys 21 and 22, respectively, at one end thereof; a high-speed power-transmitter and a low-speed power-transmitter (designated by T and T', respectively) loosely mounted upon the power-shaft, the one, T, comprising a sleeve 23, having a spur-wheel 24 at one end thereof and having a pin clutch member 25 at the other end thereof, and the other, T', comprising a sleeve 26, a pin clutch member 27 at the inner end thereof, a pinion 28 near the outer end thereof, and a spur-wheel 29 intermediate the pinion and clutch member, which spur-wheel is shown of a size corresponding to the size of the spur-wheel 24; a two-way or duplex clutch member 30, splined to the power-shaft 20 between the clutch members 25 and 27 and shiftable longitudinally of said shaft 20 into operative engagement with said clutch members alternately; a counter-shaft 31, journaled in suitable bearings on the top frame 6 and having fixed to one end thereof a spur-wheel 32, which meshes with the spur-wheel 24 of the high-speed power-transmitter and has fixed to the opposite end thereof a worm 33, which meshes with a worm-wheel 34, fixed to the shaft 14 of the roll R, which worm and worm-wheel are preferably housed in a suitable casing, such as shown at C, Figs. 2 and 3; a spur-wheel 35, loosely mounted upon the counter-shaft 31 and meshing with the pinion 28 of the low-speed transmitter T', said spur-wheel 35 having a spring-actuated pawl 36, pivotally supported thereon at one side thereof and engaging a tooth of a ratchet 37, fixed to said counter-shaft.

The spur-wheel 29, described, which is fixed to the sleeve 26 of the low-speed transmitter T', meshes with a corresponding wheel 29', fixed to a sleeve 39, loosely mounted upon the counter-shaft 31, this sleeve also having an eccentric 40, pivotally connected by a pitman 41 to a shaker (designated in a general way by S) supported for reciprocatory movement transversely of the feeder F, which shaker comprises a carrier 42, supported for reciprocatory movements in suitable bearings in the top frame and having a series of remotely-disposed fingers or plates 43, extending outwardly therefrom in the plane of movement of the feeder, the spur-wheels 29 and 29', the shaker-actuating eccentric 40 and its connections constituting what might be herein consistently termed the "shaker-actuator," which actuator is constructed and organized to operate the shaker intermittently, each operation thereof taking place during the effective operation of the low-speed transmitter T', and while it is controlled in its operation by the feeder-actuating mechanism it has no effect upon the operation of such mechanism and could, if it is unnecessary to employ a shaker for agitating the material during its passage over the end of the upper run of the feeder, be conveniently dispensed with.

The operation of the feeder-actuating mechanism is as follows: Assuming the shiftable two-way clutch 30 to be in engagement with the clutch member 25 of the high-speed power-transmitter and the fast pulley 21 as being driven by belting from any source of power, (not shown,) the spur-wheel 24 will be rotated in the direction of the arrow thereon, thus driving the spur-wheel 32 and shaft 31 in the direction of the arrow, and will, through the worm 33 and worm-wheel 34, rotate the shaft of the feeder-supporting roll R and advance the upper run of the feeder in the direction of the arrow at the maximum velocity to supply a stream of large volume to the load-receiver. When the two-way clutch member 30 is shifted from the position shown in Fig. 2 to that shown in Fig. 4, it will couple the low-speed power-transmitter to the power-shaft and will, through the medium of the pinion 28, spur-wheel 35, and clutch devices 36 and 37, rotate the counter-shaft 31 at a low speed, which will transmit a relatively low velocity to the feeder F through the medium of the worm 33, worm-wheel 34, and feed-roll shaft 14.

It will be obvious that when the low-speed power-transmitter is effective for actuating the counter-shaft 31 and feeder F the high-speed power-transmitter will be driven through the medium of the intermeshing gears 32 and 24, but will run loose upon the power-shaft 20.

When the clutch member 30 is in the position shown in Fig. 4 and the feeder F is driven at a low velocity through the medium of the low-speed power-transmitter, the shaker-actuating mechanism will be simultaneously operated to impart a reciprocatory movement to the shaker.

As a convenient means for operating the two-way clutch 30 I have provided a clutch-actuator (designated in a general way by C') which is controlled in its movements by a shiftable member of the weighing mechanism, as will be hereinafter more fully described, the construction and organization of said clutch-actuator being such that when the load-receiver is in its fully-elevated position said actuator will be effective for retaining the clutch member 30 in engagement with the clutch member of the high-speed power-transmitter, will be effective as the weighing-machine approaches its poising position for shifting the clutch member 30 out of engagement with the high-speed power-transmitter and into engagement with the clutch member of the low-speed power-transmitter, and will operate on the arrival of the load-receiver at its truly-poised position to shift the clutch to a neutral position between and out of engagement with the two clutch members of the high and low speed power-transmitters, thereby arresting the feed movement of the feeder.

In machines of this character employing an endless feeder for supplying material to the load-receiver it has been found in practice that when the movement of the feeder is abruptly arrested a certain portion of the material at the discharge end of the material-supporting run of said feeder will on account of the momentum required be thrown over the end of said run, and for the purpose of preventing this material from falling into the load-receiver after the feeder has been stopped, which might have a tendency to overpoise the weighing mechanism, I have provided in operative relation with the discharge end of said feeder a surplus-receiving device (herein shown in the nature of a scoop-valve 70) pivotally supported on the framework and having a cut-off plate oscillatory in a path intersecting the path of flow of the material after it leaves the discharge end of the material-supporting run of the feeder, said surplus-receiving device or valve being located when in its material-receiving position with the rear edge of its cut-off plate somewhat below the lower portion of the periphery of the forward feeder-supporting roll and in position to receive the material which may be forced over the forward end of said feeder after the feeder is stopped.

As a means for actuating the valve to advance the same to a position for cutting off the supply to the load-receiver I have provided a valve-actuator 45, (shown as a lever,) fulcrumed at 46 on the framework and having a weight $w^2$ at the rear end thereof and having a cam-engaging roll at the forward end thereof. This actuator is connected to the valve by means of a link 48, which link is pivotally connected at its upper end to the valve at one side thereof and is pivotally connected at its lower end to a crank-arm 49, fixed to the pivot-shaft 46 of said actuator in such manner that on the descending movement of the actuating-lever 45 an advancing movement will be imparted to said valve.

As a means for operating the valve-actuating lever 45 to impart a retractive movement to said valve and also for regulating or retarding the closing movement of said valve-actuator I have provided a cam-plate 50, pivotally supported at 51 upon a bracket on the framework and having a crank-arm 52 fixed to and extending outward from the pivot of said cam-plate, which cam-plate has a cam-face 53, adapted on a forward movement of the cam-plate for depressing the forward end of the valve-actuator 45 to impart a retractive movement to the valve and also adapted for retarding the valve-closing movement of the valve-actuator 45 when the parts are in the positions shown in Fig. 3. This valve-retracting cam-plate 50 is actuated in one direction by and controlled in its movement in an opposite direction through the medium of a thrust-rod 55, pivotally connected at its upper end to the crank-arm 52 on the cam-plate 50 and supported at its lower end on an oscillatory beam B'', carried by the weighing mechanism in the usual manner. This valve-actuating lever 45 also constitutes one member of the clutch-actuating mechanism C'.

The clutch-shifting mechanism, in the preferred form thereof shown most clearly in Fig. 3, includes, in addition to the valve-actuating lever 45, a toggle (designated in a general way by $T^3$) consisting of three toggle-links 57, 58, and 59, pivotally connected together at their inner ends, as shown at 60, the links 57 and 58 constituting the toggle proper and the link 59 constituting a thrust-link or actuating member for said toggle. The toggle-link 57 is pivotally connected at its rear end to a clutch-shifting rod 61, which is pivotally connected at its lower end to the bracket 61' on one of the side frames and is bifurcated at its upper end to straddle and furnished with rollers which fit in a groove 62 in the clutch-sleeve 30, and the member 58, is pivotally connected at its forward end to the framework and is furnished with a detent-plate 63, adapted for engaging catches 64, 65, and 66 on a latch $L^2$, pivotally supported at 67 on the side frame below the toggle-link 58, said latch having an actuator-arm 68, furnished with an adjustable stop device 69 at the outer end thereof for limiting or controlling the effective throw of said latch, which stop device is shown as a set-screw extending through the forward end of said latch-arm, with its inner end in position to be engaged by a projection 69', fixed to the pivot-shaft 46 of the valve-actuator 45.

The thrust-link 59 of the toggle is shown bifurcated at 71, at the lower end thereof, and straddles a pin 72 on an actuator-arm 73, fixed to the pivot-shaft 46 of the valve-actuator 45. Said link is also furnished with a weight $w^3$ for shifting the toggle-links 57 and 58 from the position shown in Fig. 2 successively to the positions shown in Figs. 4 and 5 on the descending or valve-closing movement of the actuator 45, as will be readily understood by a comparison of the several figures referred to.

From the foregoing description it will be evident that as the cam-plate 50 is shifted in the direction of the arrow thereon during the descending movement of the load-receiver of the weighing mechanism the valve-actuator will have a gradual valve-closing movement and will after the same arrives at a predetermined point in its descending movement, or at the position shown in Fig. 4, strike the stop device of the actuator-arm 68 of the latch L² and shift the catch-arm 68' of said latch to a position for disengaging the catch 64 from the detent 63 of the toggle-link 58, allowing the toggle to be carried, by means of the weighted link 59, to its dead-center position, as shown in Fig. 4, where the catch 65 will engage said detent. This movement of the toggle will cause the clutch-shifting rod 61 to shift the two-way clutch member from the position shown in Figs. 2 and 3 to that shown in Fig. 4, thus coupling the low-speed power-transmitter to the power-shaft 20 and reducing the speed of the feeder F to its minimum velocity.

On the further descending movement of the valve-actuator from the position shown in Fig. 4 to that shown in Fig. 5 the valve will be shifted to its fully-closed position and the latch L' will have the catch 65 disengaged from the detent 63 of the toggle-link 58, which will cause the actuating-link 59 to shift the toggle-links 57 and 58 to a point below their dead-center positions, carrying the clutch-shifting rod 61 to a position for holding the shiftable clutch member 30 at a neutral position between and out of engagement with the clutch members of the high and low speed power-transmitters T and T', thus arresting the feed movement of the feeder.

On the ascending movement of the load-receiver and beam mechanism the movement of the cam-plate 50 will be the reverse of that just described and the cam-face of said plate will operate to shift the valve-actuator from the position shown in Fig. 5 to that shown in Fig. 3, carrying the actuator-arm 73 upward, which will impart an upward thrust to the thrust-link 59 of the toggle and shift the toggle to the position shown in said Fig. 3. The latch L² is so weighted as to cause the catch 64 to reëngage the detent 63 of the toggle-link 58 when said toggle-link has arrived at the position thereof shown in Fig. 3.

For the purpose of conducting any material to the load-receiver which may accidentally fall over the rear of the feeder I have provided an inclinedly-disposed spout 75, whose upper end is located below and slightly in the rear of the feed-roll R and whose lower discharge end is located in position to discharge material into the load-receiver.

The closer-latch actuator is shown as a projection 55' on the thrust-rod 55, located in position for engaging and tripping the closer-latch L' at a predetermined point in the movements of the weighing mechanism, said latch L' being operated in the usual manner.

It will be obvious that instead of employing a ratchet-clutch and spring-actuated pawl between the spur-wheel 35 and counter-shaft 31 of the construction and organization shown in the accompanying drawings any suitable form of clutch might be employed in lieu thereof without departure from this invention.

Having described my invention, I claim—

1. The combination, with weighing mechanism including a load-receiver, of a feeder; driving mechanism for said feeder, including a shaft having a high and a low speed power-transmitter loosely mounted thereon; a clutch for coupling the transmitters to the shaft independently; a clutch-actuator embodying a toggle having a weighted vertically-disposed thrust member capable of moving the toggle in one direction by its own gravity; means controlled by the weighing mechanism for imparting a vertical movement to the thrust member for shifting the toggle in another direction; and a device controlled by said means for arresting said toggle at successive points in one movement thereof.

2. The combination, with weighing mechanism including a load-receiver, of an endless-band feeder; driving mechanism for said feeder, including a shaft having a high-speed power-transmitter and a low-speed power-transmitter loosely mounted thereon; clutch mechanism including an actuating-toggle having a gravitative thrust member for coupling the two power-transmitters to the shaft successively and independently; a counterweighted actuator for imparting an upward movement to said thrust member; and a latch controlled by the counterweighted actuator for intermittently engaging a detent on the toggle for arresting said toggle at successive points in one movement thereof.

3. The combination, with weighing mechanism including a load-receiver and with a supply-hopper, of an endless feeder disposed below said hopper with its discharge end above the load-receiver; rolls supporting said feeder; power-driven actuating mechanism in connection with the shaft of one of said rolls and embodying a power-shaft, a high and a low speed power-transmitter loosely mounted on said shaft, and a clutch splined to said shaft and shiftable for coupling said power-transmitters to said shaft alternately or successively; means controlled by the weighing mechanism for actuating the clutch and embodying a toggle having a weighted thrust member; an actuating-lever for operating the toggle in one direction; and a device for arresting said toggle at successive points in its movements in the opposite direction.

4. The combination, with weighing mechanism including a load-receiver and with a supply-chute, of a material-feeder supported below said chute; differential-speed actuating mechanism in operative connection with said feeder and embodying a power-shaft and two power-transmitters of different speeds; a clutch device for coupling the power-transmitters to the shaft independently; a toggle in operative connection with the clutch and embodying a gravitative member for shifting the clutch in one direction; means controlled by the weighing mechanism for operating the toggle to shift the clutch in an opposite direction and an oscillatory latch having a series of catches and operative by the last-mentioned means for arresting the toggle at predetermined points in one movement thereof.

5. The combination, with a feeder and with actuating mechanism including a power-shaft, two differential power-transmitters loosely mounted thereon, and a clutch for coupling the power-transmitters alternately to said shaft, of clutch-actuating mechanism comprising a toggle having a weighted gravitative member for shifting the clutch in one direction; means controlled by the weighing mechanism for retarding the descending movement of the toggle-actuating end of said lever; a toggle-arresting latch disposed between said toggle and lever and effective for arresting said toggle at successive points in its movement in one direction; and means carried by the weighted lever for engaging and releasing the said latch at successive points in the descending movement of said lever.

6. The combination, with weighing mechanism including a load-receiver and with a feeder, of variable-feed actuating mechanism therefor including a shiftable clutch device, a toggle in operative connection with the clutch device and embodying a gravitative member for shifting the clutch in one direction; a latch for arresting the toggle at successive points in its descending movements; a gravitative actuating-lever fulcrumed on the framework and having an arm in shiftable connection with the gravitative member of the toggle and embodying means for tripping the toggle-holding latch at a predetermined point in the gravitative movement of said lever; and means controlled by the weighing mechanism for imparting a toggle-actuating movement to said lever, and also for controlling the gravitative movement of said lever.

7. The combination, with weighing mechanism including a load-receiver and with an endless feeder having its discharge end above said load-receiver, of differential-speed actuating mechanism in operative connection with said feeder and embodying a shiftable clutch and a clutch-actuator controlled by the weighing mechanism and embodying a gravitative toggle and a gravitative actuating-lever, the former of which is controlled in its movements in one direction, and is operated in the opposite direction, by the latter.

8. The combination, with weighing mechanism including a load-receiver and with an endless feeder having its discharge end above said load-receiver, of differential-speed actuating mechanism in operative connection with said feeder and embodying a shiftable clutch; clutch-actuating mechanism controlled by the weighing mechanism and embodying a gravitative toggle and a gravitative actuating-lever, the former of which is controlled in its movements in one direction, and is operated in the opposite direction, by the latter; a latch having a series of catches for interrupting the gravitative movement of the toggle at successive points in said movement; and means carried by the gravitative actuating-lever for tripping the latch at successive points in the gravitative movement thereof.

9. The combination, with weighing mechanism including a load-receiver and with an endless feeder having its discharge end above said load-receiver, of differential-speed actuating mechanism in operative connection with said feeder and embodying a shiftable clutch; a clutch-actuator controlled by the weighing mechanism, embodying a gravitative toggle and a gravitative actuating-lever, the former of which is controlled in its movements in one direction, and is operated in the opposite direction, by the latter; a latch embodying means for engaging, and arresting, the toggle at successive points in the movement thereof in one direction; and means operative on the descent of the gravitative actuating-lever for releasing said latch.

10. A weighing-machine embodying a shiftable member; a weighted gravitative toggle in operative connection with, and effective for shifting, said member in one direction; a gravitative actuating-lever fulcrumed on the framework and having an arm operatively connected with the toggle in such a manner as to control the gravitative movement of the toggle; and means controlled by the weighing mechanism for elevating the toggle-actuating end of said lever to shift the toggle in an opposite direction.

11. In a weighing-machine, the combination, with a shiftable member, of an actuating-toggle in operative connection with said shiftable member and comprising three pivotal connecting-links one of which is bifurcated at its lower end and is provided with a weight for shifting said toggle to, and below, its dead-center position; a gravitative actuating-lever fulcrumed on the framework and having a projection extending into the bifurcated end of the weighted toggle member; and means controlled by the weighing mechanism for shifting the actuating-lever to a position for carrying the toggle to, and above, its dead-center position.

12. A weighing-machine embodying a shiftable member; a toggle in operative connection with said shiftable member; means carried by, and effective for shifting, the toggle in one direction; an actuating-lever in connection with said toggle; a reactionary latch for arresting the toggle at successive points in one movement thereof; means carried by the actuating-lever for tripping the latch; and means controlled by the weighing mechanism for actuating said lever to shift the toggle in an opposite direction.

13. The combination, with weighing mechanism including a load-receiver and with a material-feeder and differential actuating mechanism therefor including a clutch for controlling the speed of the feeder, of a valve shiftable into operative relation with the feeder for cutting off the supply after the feeder is stopped; an actuating-lever in connection with said valve; means operable by the weighing mechanism for controlling the movements of the actuating-lever; and a clutch-actuating toggle in operative connection with said lever.

14. In a weighing-machine, the combination, with a feeder and with a differential-speed mechanism in operative connection with said feeder and embodying a power-shaft, a high and a low speed power-transmitter loose upon said shaft, and a clutch splined to said shaft for coupling said power-transmitters thereto independently, of an oscillatory surplus-catcher or valve shiftable in a path crosswise of the supply-stream; a weighted valve-actuating lever in operative connection with the valve and adapted for closing said valve on the gravitative movement of said lever; a cam-plate pivotally supported in operative relation with the valve-actuating lever and having a cam-face for retarding the valve-actuator on the closing movement thereof; means controlled by the weighing mechanism for actuating said cam-plate to impart a valve-opening movement to the actuator; a clutch-actuating toggle in operative connection with the clutch and valve-actuator; and a device controlled by the valve-actuator for arresting said toggle at successive points in its movements.

15. In a weighing-machine, the combination, with a feeder, of differential-speed mechanism in operative connection with said feeder and embodying a power-shaft, a high and a low speed power-transmitter loose upon said shaft, and a clutch splined to said shaft for coupling said power-transmitters thereto alternately; an oscillatory surplus-catcher or valve shiftable on a path crosswise of the supply-stream; a weighted valve-actuating lever in operative connection with the valve and adapted to close said valve on the gravitative movement of said lever; a cam-plate pivotally supported in operative relation with the valve-actuating lever and having a cam-face for retarding the valve-actuator on the valve-advancing movement thereof; means controlled by the weighing mechanism for actuating said cam-plate to impart a valve-opening movement to the actuator; and a toggle device in operative connection with the clutch and having a weighted depending member in shiftable connection with the valve-actuating lever.

16. The combination, with weighing mechanism including a load-receiver and with a power-driven feeder, of differential feeder-actuating mechanism in operative connection with the feeder and embodying a power-shaft, a high and low speed power-transmitter loosely mounted on said shaft, and a clutch device intermediate to, and effective for coupling, said power-transmitters to said shaft alternately; a valve supported for oscillatory movement and having a cut-off plate shiftable below the discharge end of the feeder; means including a valve-actuating lever controlled by the weighing mechanism, for advancing and retracting said valve; a toggle in operative connection with the clutch device and having a weighted actuating member in shiftable connection with the valve-actuating lever, the connection between the toggle and valve-actuating lever being such that upon the valve-advancing movement of the actuating-lever the actuating member of the toggle will descend and shift the clutch device in one direction, and upon a valve-retracting movement of said valve-actuating lever an ascending movement will be imparted thereby to the toggle for shifting the clutch in an opposite direction; a clutch for arresting the toggle at successive points in one of its movements; and means carried by the valve-actuating lever for tripping said latch.

17. The combination, with weighing mechanism including a load-receiver and with a supply-hopper, of a power-driven feeder; differential-speed feeder-actuating mechanism including a driving-shaft and a driven shaft, the latter of which is in geared connection with the feeder; a high and a low speed power-transmitter loosely mounted upon the driving-shaft, the former having a gear of large diameter fixed thereto, and the latter having a gear of smaller diameter fixed thereto; a clutch splined to the driving-shaft, intermediate the high and low speed transmitters, and adapted for coupling said transmitters alternately to said shaft; a gear-wheel fixedly secured to the driven shaft and meshing with the larger gear of the high-speed power-transmitter; a gear-wheel loosely mounted on the driven shaft and meshing with the small gear of the low-speed power-transmitter; a pawl-and-ratchet device in connection with the driven shaft and its loose gear and effective, when the low-speed power-transmitter is coupled to the driving-shaft, for coupling the loose gear and driven shaft together to effect a rotation of said driven shaft; and means controlled by the weighing mechanism for operating the clutch device of the driving-shaft at a predetermined point in the movement of the load-receiver to shift the same into operative engagement with first one and then the other power-transmitter, and then to a neutral position between and out of engagement with said power-transmitters.

JOHN CHRISTIANSEN.

Witnesses:
F. N. CHASE,
JOHN O. SEIFERT.